US006483028B2

(12) United States Patent
DeBartolo, Jr. et al.

(10) Patent No.: US 6,483,028 B2
(45) Date of Patent: Nov. 19, 2002

(54) BUS BARS FOR POKE-THROUGH FLOOR FITTING

(75) Inventors: Joseph V. DeBartolo, Jr., North Stonington, CT (US); Peter A. Czerner, Monroe, CT (US); Nelson Bonilla, West Haven, CT (US); Alfred N. Goodman, Bethesda, MD (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/011,433

(22) Filed: Dec. 11, 2001

(65) Prior Publication Data

US 2002/0040799 A1 Apr. 11, 2002

Related U.S. Application Data

(63) Continuation of application No. 09/481,568, filed on Jan. 11, 2000, now Pat. No. 6,353,180.

(51) Int. Cl.[7] .................................................. H02G 3/04
(52) U.S. Cl. .......................... 174/48; 174/50; 174/53; 439/650; 52/220.8; 220/3.3
(58) Field of Search .............................. 174/48, 50, 53; 439/650, 535, 536, 538; 52/220.8, 220.1, 220.5, 220.7; 220/3.7, 3.4

(56) References Cited

U.S. PATENT DOCUMENTS

| 1,318,733 | A | | 10/1919 | Eckstein |
| 1,717,836 | A | | 6/1929 | Conner |
| 2,042,633 | A | * | 6/1936 | Richardson ................. 439/444 |
| 2,916,540 | A | | 12/1959 | Rostan |
| 3,995,102 | A | * | 11/1976 | Kohaut ........................ 174/48 |
| 4,099,020 | A | * | 7/1978 | Kohaut ........................ 174/48 |
| 4,243,835 | A | | 1/1981 | Ehrenfels |
| 4,266,266 | A | | 5/1981 | Sanner |
| 4,270,318 | A | * | 6/1981 | Carroll et al. ......... 52/220.8 X |
| 4,323,724 | A | | 4/1982 | Shine |
| 4,336,416 | A | | 6/1982 | Goodsell |
| 4,433,204 | A | | 2/1984 | Wuertz |
| 4,477,694 | A | | 10/1984 | Kohaut |
| 4,496,790 | A | | 1/1985 | Spencer |
| 4,583,799 | A | | 4/1986 | Wiley |
| 4,770,643 | A | | 9/1988 | Castellani et al. |

(List continued on next page.)

FOREIGN PATENT DOCUMENTS

FR 1116385 5/1954

OTHER PUBLICATIONS

RACO Electrical Products R–192 Catalog, published prior to Oct. 1998, p. C3.
Hubbell Premise Wiring, Inc., Catalog #1100R, published prior to Oct. 1998, pp. 122 and 133.
Hubbell Wiring Devices & Systems–Kellems Wire Management–Marine Wiring Products Catalog #2000, 1995, pp. K–17 and K–80 through K–88, published prior to Oct. 1998.

Primary Examiner—Anthony Dinkins
Assistant Examiner—Dhiru R Patel
(74) Attorney, Agent, or Firm—Jeffrey J. Howell; Alfred N. Goodman

(57) ABSTRACT

A fire-rated, poke-through floor fitting preferably for use in a three inch diameter bore within a floor. The fitting has an electrical receptacle that is sized to fit within the three inch bore. The receptacle preferably has two pairs of electrical outlets coupled to the electrical receptacle along with four voice/data jacks. The fitting provides a high number of electrical outlets and voice/data jacks, while maintaining a relatively low profile and easy accessibility. Each pair of electrical outlets can be separately connected to different power sources or each pair can be connected to the same power source. The bus bars of the receptacle can have various configurations, including non-overlapping orientations.

20 Claims, 12 Drawing Sheets

U.S. PATENT DOCUMENTS

| | | |
|---|---|---|
| 4,827,080 A | 5/1989 | Castellani et al. |
| 4,922,668 A | 5/1990 | Payne |
| 4,978,318 A | 12/1990 | Wiley et al. |
| 4,993,970 A | 2/1991 | Littrell |
| 5,003,127 A | 3/1991 | Sosinski et al. |
| 5,008,491 A | 4/1991 | Bowman |
| 5,032,690 A | 7/1991 | Bloom |
| 5,064,969 A | 11/1991 | Bloom |
| 5,102,355 A | 4/1992 | Murphy et al. |
| 5,107,072 A | 4/1992 | Morgan |
| 5,109,316 A | 4/1992 | Murphy |
| 5,121,594 A | 6/1992 | Wuertz |
| 5,124,876 A | 6/1992 | Misencik et al. |
| 5,134,541 A | 7/1992 | Frouin |
| 5,135,411 A | 8/1992 | Wiley et al. |
| 5,220,131 A | 6/1993 | Wuertz |
| 5,237,128 A | 8/1993 | Wuertz |
| 5,272,278 A | 12/1993 | Wuertz |
| 5,281,172 A | 1/1994 | Luu |
| 5,393,930 A | 2/1995 | Wuertz |
| 5,410,103 A | 4/1995 | Wertz |
| 5,422,434 A | 6/1995 | Wuertz et al. |
| 5,460,542 A | 10/1995 | Castellani et al. |
| 5,466,886 A | 11/1995 | Lengyel et al. |
| 5,486,121 A | 1/1996 | Miller |
| 5,541,363 A | 7/1996 | Weise et al. |
| 5,601,455 A | 2/1997 | Bagga |
| 5,606,606 A | 2/1997 | Schneider et al. |
| D389,459 S | 1/1998 | Byrne |
| 5,747,732 A | 5/1998 | Bera et al. |
| 5,763,826 A * | 6/1998 | Castellani et al. ............. 174/48 |
| 5,814,764 A | 9/1998 | Rohaut |
| D399,826 S | 10/1998 | Byrne |
| D408,355 S | 4/1999 | Welsh et al. |
| D409,980 S | 5/1999 | Byrne |
| 6,018,126 A * | 1/2000 | Castellani et al. ............. 174/48 |

* cited by examiner

BUS BARS FOR POKE-THROUGH FLOOR FITTING

CROSS REFERENCE TO RELATED APPLICATIONS

This application is a continuation of co-pending U.S. patent application Ser. No. 09/481,568 filed Jan. 11, 2000 now U.S. Pat. No. 6,353,180, the entire contents of which are incorporated herein by reference.

Additionally, related subject matter is contained in co-pending U.S. patent application Ser. No. 09/432,421 filed Nov. 2, 1999, and U.S. Pat. No. 6,114,623 to Bonilla et al.; each of which being expressly incorporated herein by reference.

FIELD OF THE INVENTION

The present invention relates to a poke-through floor fitting to enable access to both electrical outlets and telecommunication connections. More specifically, the present invention relates to a fire-rated poke-through floor fitting for use in a three-inch diameter bore that has four electrical outlets and four voice/data jacks while maintaining a low profile and with non-overlapping bus bars.

BACKGROUND OF THE INVENTION

Typically, fire-rated poke-through fittings provide a floor receptacle for electrical outlets and/or for telecommunication access. Generally, these poke-through fittings are mounted in a core-drilled, approximately three or four inch diameter hole, which is commonly formed in a concrete floor.

Due to the three inch diameter of the bore used for the typical poke-through fittings, the size of the typical fitting is inherently constrained, especially if it is desired to keep the fitting as close to the floor as possible, i.e., if it is desired to keep the fitting relatively flat with a low profile. Recently, the consistently increasing need for additional electrical outlets and telecommunication access at each workstation has made the prior art fittings deficient due to the limited number of electrical outlets and the limited amount of telecommunication access. This is especially true when a low profile, but easily accessible fitting is desired. Prior art fitting are also deficient in that they require complicated bus bar configurations due to the limited space within the fitting.

Examples of prior art fittings are disclosed in the following U.S. Pat. Nos. 4,770,643 to Castellani et al.; 4,323,724 to Shine; 5,008,491 to Bowman; 5,442,434 to Wuertz et al.; 5,393,930 to Wuertz; 5,272,278 to Wuertz; 5,237,128 to Wuertz; 5,220,131 to Wuertz; 5,121,594 to Wuertz; 4,433,204 to Wuertz; 4,336,416 to Goodsell; 4,243,835 to Ehrenfels; 5,410,103 to Wuertz; 4,496,790 to Spencer; 4,922,668 to Payne; 4,266,266 to Sanner; 5,460,542 and 5,763,826 to Castellani et al.; and 4,583,799 to Wiley the disclosures of which are incorporated herein by reference.

SUMMARY OF THE INVENTION

Accordingly, an object of this invention is to provide an improved poke-through floor fitting.

Another object of this invention is to provide an easily assembled outlet fitting with non-overlapping bus bars.

Another object of this invention is to provide an improved poke-through floor fitting with increased electrical connections and increased telecommunication access.

Still another object of the invention is to provide a poke-through floor fitting with a low profile that is easily accessible.

Yet another object of this invention is to provide a poke-through floor fitting having two pairs of electrical outlets that are each electrically connected to a different electrical source.

The foregoing objects are basically obtained by providing a fitting comprising: an electrical receptacle; and a first pair of electrical outlets coupled to the electrical receptacle and having a first bus bar, a second bus bar, and a third bus bar, each of the first, second, and third bus bars having first and second ends, each of the first and second ends having a terminal for receiving a prong of an electrical plug in a first direction, and each of the first, second, and third bus bars being spaced from each of the other of the first, second and third bus bars in a second direction, which is substantially perpendicular to the first direction.

The foregoing objects are further obtained by providing a fitting assembly comprising: a first pair of electrical plugs, each of the plugs having prongs extending from a base and a front surface extending transversely to the base; a surface having an approximately three inch diameter, substantially circular opening; a electrical receptacle positioned within the opening; a first pair of electrical outlets coupled to the electrical receptacle with the first pair of electrical plugs being positioned within the first pair of electrical outlets and substantially parallel to each other with the front surface of each of the first pair of electrical plugs facing in a first direction.

The foregoing objects are still further obtained by providing A fitting assembly comprising: a surface with an approximately three inch diameter, substantially circular opening having an axis; an electrical receptacle positioned within the opening; and a first pair of electrical outlets coupled to the electrical receptacle and having a first bus bar, a second bus bar, and a third bus bar, each of the first, second, and third bus bars being spaced from each other in a non-overlapping orientation when viewed substantially parallel to the axis.

Other objects, advantages, and salient features of the invention will become apparent from the following detailed description which, taken in conjunction with the annexed drawings, discloses a preferred embodiment of the invention.

BRIEF DESCRIPTION OF THE DRAWINGS

Referring to the drawings which form a part of this disclosure.

DETAILED DESCRIPTION OF PREFERRED EMBODIMENTS

Figure 1:
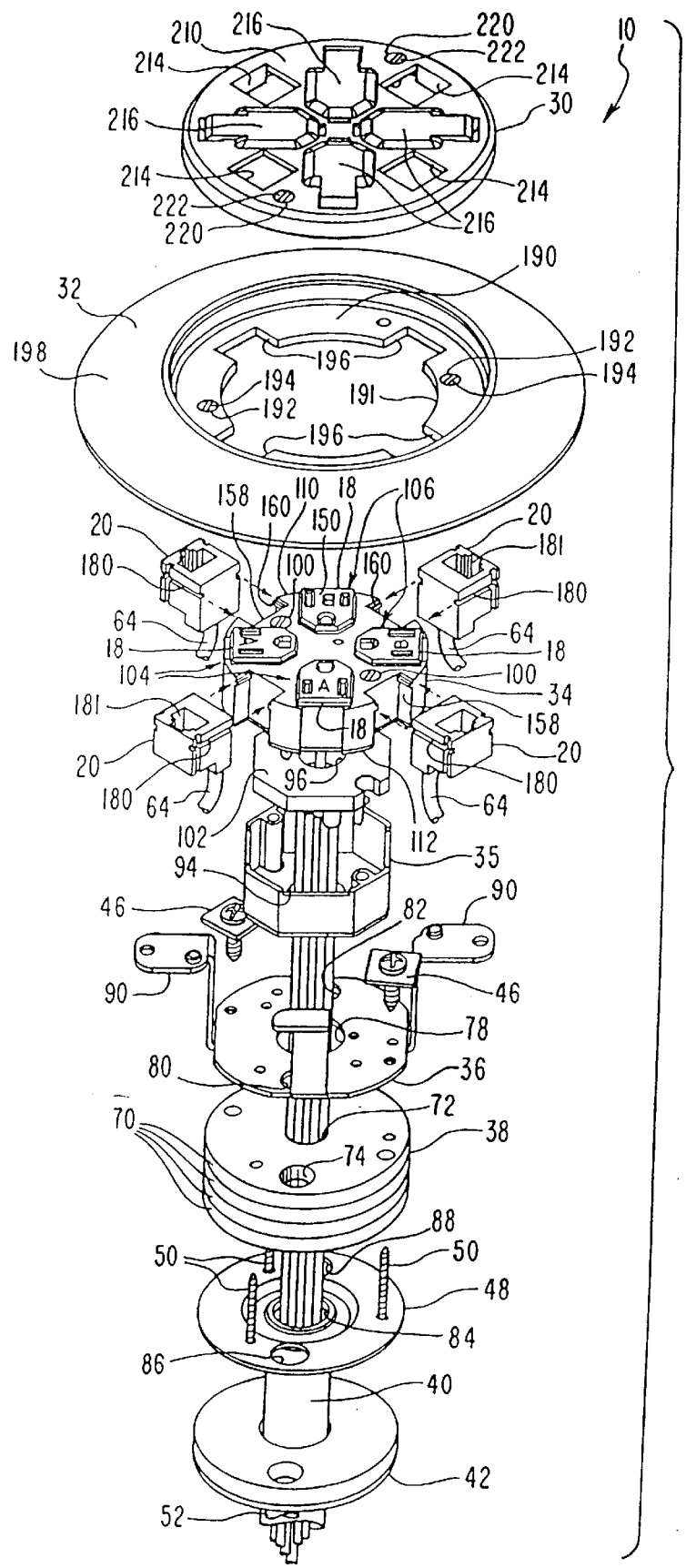
FIG. 1 is a top-side exploded, perspective view of a poke-through floor fitting in accordance with a first embodiment of the present invention, illustrating the fitting detached from the floor.
Figure 2:
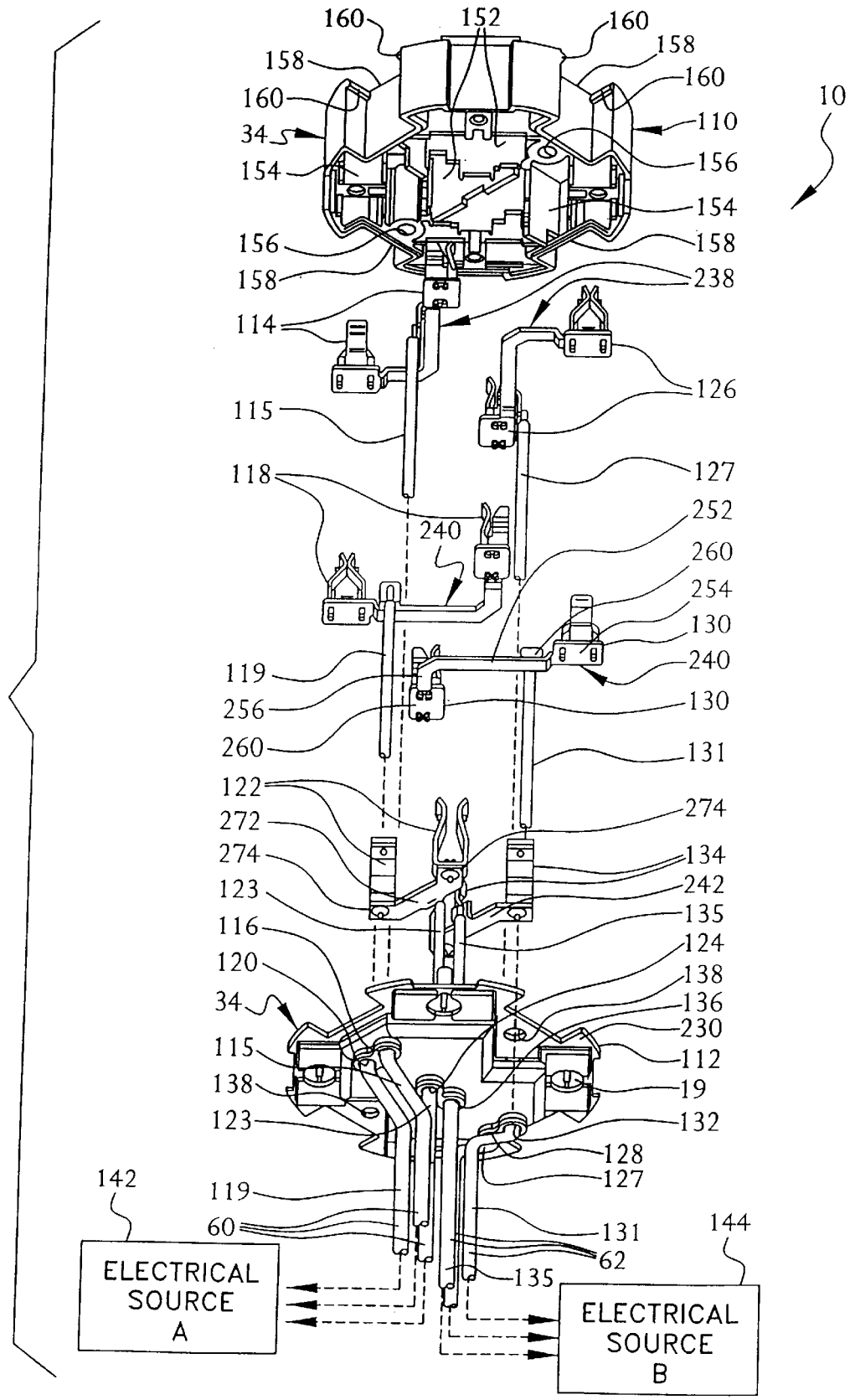
FIG. 2 is apartial, bottom-side exploded, perspective view of the poke-through floor fitting in accordance with the first embodiment of the present invention and as illustrated in FIG. 1, but illustrating only the receptacle, the electrical contacts, the lead wires and the electrical sources.
Figure 3:
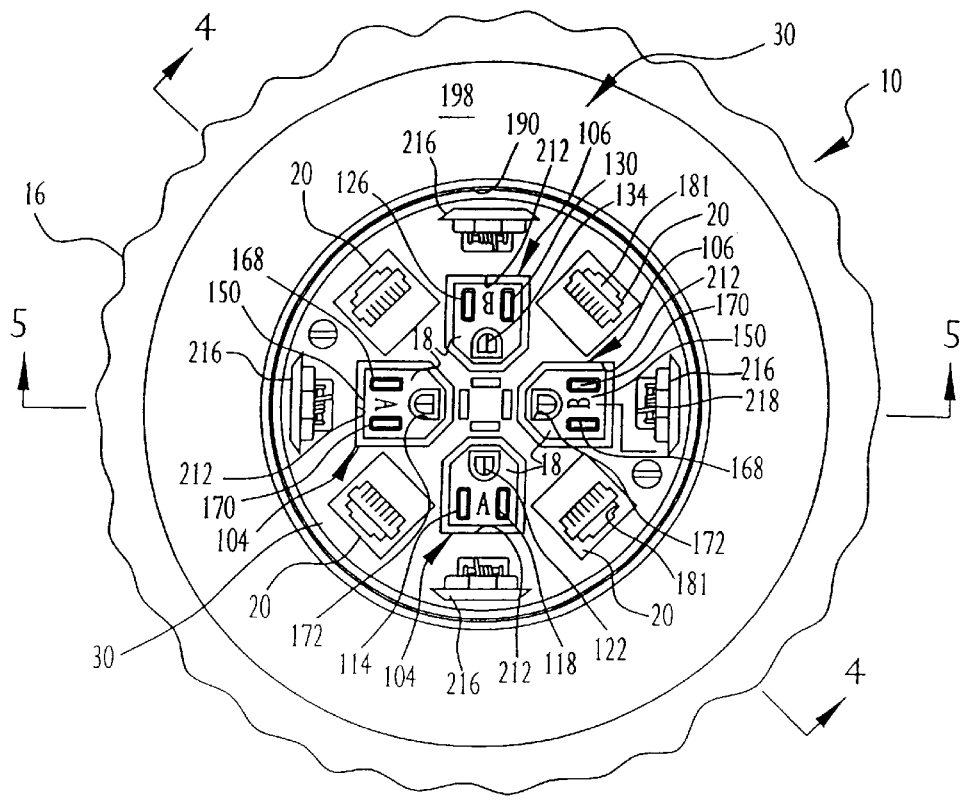
FIG. 3 is a top view of the poke-through floor fitting in accordance with the first embodiment of the invention as illustrated in FIG. 1, with the fitting inserted into a floor and with the hinged covers of the electrical outlets in the open position.

FIGS. 1–5 illustrate a fitting 10 in accordance with a first embodiment of the present invention. Fitting 10 is a fire-rated, poke-through floor fitting. When assembled, fitting 10 is preferably intended to be inserted into a bore 12 formed in a concrete floor 14. The fitting 10 then provides easy access to electrical outlets 18 and voice/data jacks 20 at a position on floor 14 that is typically spaced from any walls. Fitting 10 provides easy access to a plurality of electrical outlets 18 and voice/data outlets or jacks 20. Preferably, fitting 10 provides access to four electrical outlets 18 and four voice/data jacks 20. The fitting 10 provides access through floor 14 and on top of any flooring 16, such as carpeting, which is placed on top of floor 14.

Although fitting 10 is illustrated with a concrete floor 14, fitting 10 can be used in any surface containing an opening capable of receiving fitting 10.

Fitting 10 is formed of a cover 30, a flange 32, a receptacle 34, an insulator 35, a floor cup 36, a fire barrier 38, a wiring tube 40 with an upper flange rigidly secured thereto, and a collar 42.

The basic structure of the floor cup 36, fire barrier 38, wiring tube 40 and collar 42 in connection with fire-rated poke-through fittings are generally known in the art, and therefore will not be described in great detail herein.

Floor cup 36 in conjunction with positioning clips 46, which are also known in the art, locate and secure fitting 10 within bore 12 at the top of floor 14. Floor cup 36, fire barrier 38, and an upper disk 48 of wiring tube 40 are all secured together by screws 50 as is known in the art. Upper disk 48 is rigidly connected to wiring tube 40. Collar 42 is spaced from fire barrier 38 as necessarily dependent on the characteristics of the floor, and is also rigidly attached to wiring tube 40 as known in the art. Two wiring cylinders are also rigidly attached to collar 42. Only one wiring cylinder 52 is shown.

Wiring tube 40 provides a passageway for first and second sets of electrical wires 60 and 62, respectively, as they proceed between an electrical power sources to receptacle 34. The sets of electrical wires 60 and 62 are conventional electrical wire, which is appropriate for conventional electrical outlets.

The wiring cylinders including cylinder 52 provide a passageway for voice/data cabling 64. Preferably, one voice/data cable 64 is connected to each of the jacks 20 as known in the art. Additionally, voice/data cabling 64 is connected to appropriate apparatus; such as to telephone or voice/data transmissions systems, as known in the art.

Fire barrier 38 is an intumescent fire barrier, as generally known in the art. Preferably, fire barrier 38 is formed of a plurality of ring-shaped members 70 having a central opening 72 for receiving first and second sets of electrical wire 60 and 62 as well as side openings 74 and 76 for receiving voice/data cable 64. Preferably, each side opening 74 and 76 receives two voice/data cables 64.

Likewise, floor cup 36 and upper disk 48 have passages for electrical wires 60 and 62 and voice/data cables 64. That is, floor cup 36 has a central opening 78 and upper disk 48 has a central opening 84 for electrical wires 60 and 62. Also, floor cup 36 and upper disk 48 have side openings 80, 82 and 86, 88, respectively, for voice/data cables 64, preferably for two voice/data cables 64 in each side opening 80, 82, 86 and 88.

Insulator 35 is generally known in the art and is a preferably a plastic box-like member, which is rigidly coupled to the top of floor cup 36 by a screw (not shown). Insulator 35 has a bottom opening 94 for the passage of electrical wires 60 and 62 therethrough. Also, a fire barrier insulator 102 is positioned within insulator 35, at its bottom. Fire barrier insulator 102 is formed from a intumescent foam-like material, as generally known in the art and has an aperture 96 for the passage of electrical wires 60 and 62 therethrough.

Receptacle 34 is positioned on top of insulator 35 and is rigidly secured to floor cup 36 by screws 100, which extend through receptacle 34 and attach to a threaded opening the bottom of floor cup 36. Receptacle 34 has a top 110 and a base 112 that forms a hollow cavity and both top 110 and base 112 are preferably integrally formed from plastic material, each as one-piece, unitary members. Receptacle 34 houses two pairs of electrical outlets 18. The first pair of electrical outlets 104 comprise the "A" pair of outlets and the second pair of electrical outlets 106 comprise the "B" pair of outlets. Each pair of outlets 104 and 106 are electrically wired together as is known in the art. Receptacle 34 is efficiently formed to fit within a three inch diameter opening. That is, receptacle 34 has a width in any direction of plane 211 of less than three inches.

Base 112 acts as the support for the electrical contacts of all the electrical outlets 18. That is, on the upper surface of base 112 the contacts for the electrical outlets are rigidly attached to base 112. Additionally, base 112 has holes extending completely through base 112 for each lead wire of the first and second sets of electrical wires 60 and 62 to pass between bottom opening 94 of insulator 35 and the electrical contacts. Base 112 is rigidly attached the top 110 by screws 19. Base has a top surface 228 and a bottom surface 230.

Contact terminals for each of the first and second pairs of electrical outlets 104 and 106 are positioned on top of base 112. Specifically, with respect to the "A" side of receptacle 34, a side "A" hot contact terminal 114 is attached to base 112 and is attached to a side "A" hot lead wire 115, which extends through hole 116 in base 112. A side "A" neutral terminal 118 is attached to base 112 and is attached to a side "A" neutral lead wire 119, which extends through hole 120 in base 112. Also, a side "A" ground terminal 122 is attached to base 112 and to a side "A" ground lead wire 123, which extends through hole 124 in base 112.

With respect to the "B" side, a side "B" hot contact terminal 126 is attached to base 112 and to a side "B" hot lead wire 127, which extends through hole 128 in base 112. A side "B" neutral terminal 130 is attached to base 112 and to a side "B" neutral lead wire 131, which extends through hole 132 in base 112. Finally, a side "B" ground terminal 134 is attached to base 112 and to a side "B" ground lead wire 135, which extends through hole 136 in base 112. The terminals 114, 118, 122, 126, 130 and 134 are generally known in the art, except for their specific structural configurations. Also, the electrical connection between the terminals and the lead wires is a conventional connection that is appropriate and is known in the art; such as soldering or welding.

Lead wires 115, 119 and 123 form first set of electrical wires 60 and lead wires 127, 131, and 135 form second set of electrical wires 62. These lead wires are extend from each terminal and through their respective hole in base 112 in order to extend through wiring tube 40 to their respective electrical power source 142 and 144, as known in the art.

Preferably, the first or "A" pair of electrical outlets 104 is electrically distinct from the second or "B" pair of electrical outlets 106. That is, preferably, the side "A" hot contact terminal 114, side "A" neutral terminal 118, and side "A" ground terminal 122, extend to a first or "A" power source 142 and is electrically connected with appropriate circuitry as is known in the art. Likewise, preferably the side "B" hot contact terminal 126, side "B" neutral terminal 130, and side "B" ground terminal 134 are electrically connected to a second or "B" power source 144 through appropriate circuitry as is known in the art. Thus, the electrical separation between the "A" pair of outlets 104 and "B" pair of outlets 106. i.e., that each is preferably connected an a different power source 142 or 144, provides a more versatile fitting 10 in that each pair of outlets 104 and 106 can be electrically connected to different power sources 142 or 144. Therefore, the electrical devices plugged into the "A" outlets 18 can be electrically connected to a different power source than those electrical devices plugged into the "B" outlets 18. This allows electrical devices having larger electrical requirements to be used with fitting 10.

Top 110 of receptacle 34 is positioned on top of base 112 and completely encloses contact terminals 114, 118, 122, 126, 130 and 134. Top 110 is preferably made of a plastic material similar to base 112. Top 110 also has holes 156 for receiving screws 100, which secure top 110 and base 112 to floor cup 36.

Top 110 has a plurality of receptacle faces 150 that extend upwardly away from top 110. Two of the receptacle faces 150 form part of the "A" pair of electrical outlets 104 while the other two receptacle faces 150 form part of the "B" pair of electrical outlets 106.

Top 110 is formed of a plurality of hollow compartments 152 separated by walls 154. The compartments include one compartment for each of the individual contact terminals 114, 118, 122, 126, 130, and 134. Thus, those terminals are appropriately spaced and insulated from each other. Electrical outlets 18 can result in various forms such as NEMA 5–15R and 5–20R power outlets.

Top 110 also has four indents 158 formed on the outer surface of its side wall. Each indent 158 is sized to receive one voice/data jack 20. Voice/data jacks 20 themselves are conventional voice/data jacks as known in the art. For example, voice/data jacks 20 can be Category 5 telecommunication jacks. Further, jacks 20 can be eight position/eight wire jacks or other multi-position/multi-wire jacks.

Each voice/data jack 20 has a pair of slots 180 that are parallel and spaced. One slot 180 is formed on each side of jack 20. Also, each voice/data jack 20 has an upper opening 181 and a lower opening 182, both of which are known in the art. Upper opening 181 is the female end of a connection and is adapted to receive the appropriate male voice/data connector (not shown), which is also known in the art. For example, upper opening 181 can be sized to receive a conventional telecommunications connector located at the end of a conventional telecommunications-type cord (not shown). Lower opening receives the appropriate voice/data cable 64 for attaching to voice/data jack 20, as known in the art.

In order to receive a voice/data jack 20, each indent 158 has a pair of spaced horizontal, parallel ribs 160, which are integrally formed with the side of receptacle 34. Each indent 158 together with ribs 160 receives a single voice/data jack 20 in a slidable manner. That is, before cover 30 is placed on receptacle 34, each voice/data jack 20 is positioned such that each rib 160 of an indent 158 slides smoothly within a mating slot 180 in a voice/data jack 20. Thus, indents 158 enable each jack 20 to be slid within each indent 158 and securely positioned adjacent to the outside of receptacle 34, spaced from all of the elements within receptacle 34; such as, terminals 114, 118, etc. Also, the alternating positioning of indents 158 between electrical outlets 18 results in alternating positioning of outlets 18 and jacks 20 around the perimeter of cover 30. This further aids in producing a compact fitting, which efficiently uses limited space.

Voice/data cable 64 extends from each jack 20, through one of the side openings 80 or 82 in floor cup 36, through one of the side openings 74 or 76 in fire barrier 38 through one of the side openings 86 or 88 in upper disk 48, through one of the wiring cylinders such as cylinder 52, and proceeds to its appropriate voice/data apparatus, such apparatus being generally known in the art.

Prior to inserting jacks 20 in indents 158, the openings created by indents 158 can be occupied by inserts (not shown) that take the place of jacks 20. These inserts can be used if less than four jacks 20 are being used, or during the shipping of fitting 10, if jacks 20 are installed at a later time. Preferably, the inserts are shaped similar to jacks 20 and have parallel slots, substantially identical to slots 180 on jacks 20. Although four jacks 20 are illustrated, any number of jacks 20 can be used.

Each receptacle face 150 of top 110 has three openings for receiving an electrical plug (not shown) as known in the art. Each receptacle face 150 has a hot contact terminal opening 168, a neutral contact terminal opening 170 and a ground contact terminal opening 172.

Flange 32 is positioned on top of receptacle 34 and secured to floor cup 36 by screws 194. Flange 32 has a depressed inner portion 190 with an access opening 191 and holes 192 for receiving screws 194. Screws 194 rigidly secure flange 32 to upper extensions 90 of floor cup 36. Inner portion 190 is depressed for receiving cover 30 as discussed below. Flange 32 has an outer portion 198 extending from inner portion 190 in an inclined manner to provide a gradual increasing of fitting 10 in from flooring 16 to the height of the first and second pair of outlets 104 and 106 and jacks 20.

Preferably, flange 32 is made of metal. Also, the uppermost portion of flange 32 is substantially flush with plane 211. Further, flange 32 preferably has a total vertical height of approximately ½ inches. Thus, the height of the plane 211, or the uppermost portion of flange 32 can be approximately ½ inches. This relatively low height results in a low profile for fitting 10 which is aesthetically pleasing and is less of an obstruction to those walking on floor 14 or to the furniture on floor 14.

Cover 30 is formed of plastic material and is sized to be inserted into the depression formed by inner portion 190 of flange 32. Preferably cover 30 is generally circular in shape with an outer diameter of approximately 4 ⅜ inches in order to fit within flange 32 and in order to be as compact as possible. Cover 30 has a top planar surface 210 that lies in a plane 211, which is substantially parallel to the top surface of flooring 16 and floor 14. Top planar surface 210 has four outlet openings 212, each appropriately sized to allow a electrical plug (not shown) access to an electrical outlet 18. Also, top planar surface 210 has four jack openings 214 to allow conventional voice/data connectors (not shown) to access jacks 20.

Each outlet opening 212 has a hinged lid 216 attached adjacent thereto. Each hinged lid 216 is biased by a spring 218 towards the closed position, in which the lid 216 covers a single outlet opening 212 completely and lies substantially parallel to top planar surface 210. Cover 30 also has holes 220 for receiving screws 222 for rigidly securing cover 30 on flange 32.

Figures 4, 5:
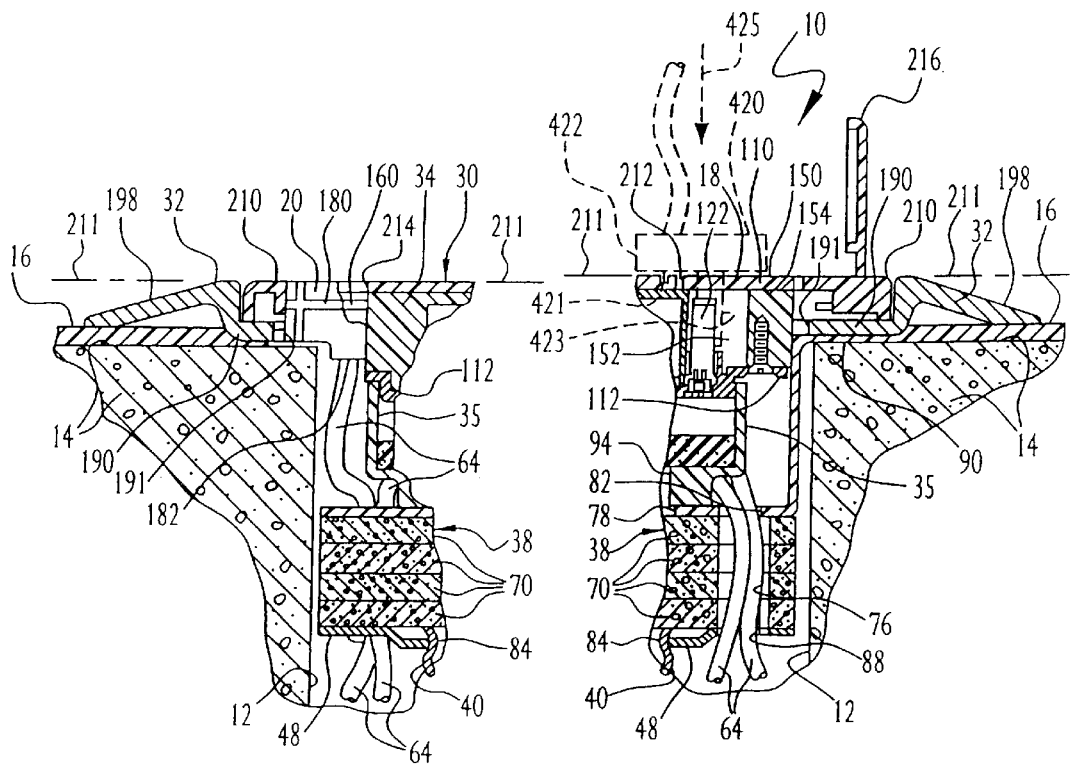
FIG. 4 is a partial cross-sectional view of the floor fitting in accordance with the first embodiment, taken along line 4—4 of FIG. 3.
FIG. 5 is a partial cross-sectional view of the floor fitting in accordance with the first embodiment taken along line 5—5 in FIG. 3.

As seen in FIGS. 4 and 5, the top planar surface 210 is substantially flush with plane 211. Also, the top of each jack 20 and the top of each receptacle face 150 is substantially flush with plane 211 and surface 210. Although, receptacle faces 150 and the tops of jacks 20 can be slightly below plane 211, preferably, these elements do not extend above plane 211 so that a smooth profile may be maintained between the elements. This configuration of the smooth, low profile of fitting 10 allows for a more aesthetically pleasing appearance and is less of an obstruction for those walking on or around an unused fitting 10, with lids 216 in the closed position.

Figure 6:
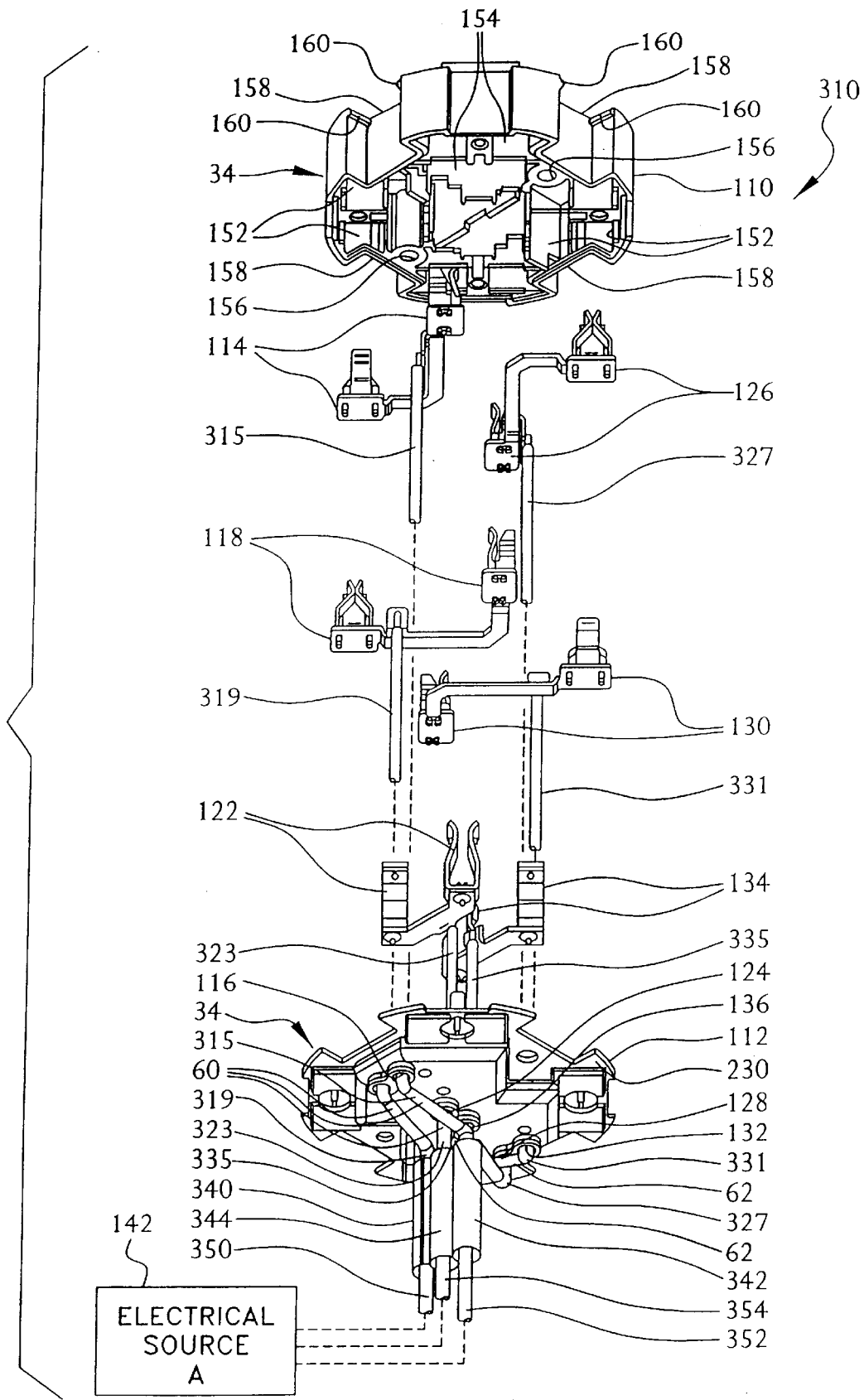
FIG. 6 is a partial, bottom-side exploded, perspective view of the poke-through floor fitting similar to FIG. 2, but in accordance with a second embodiment of the present invention.
Figure 7:
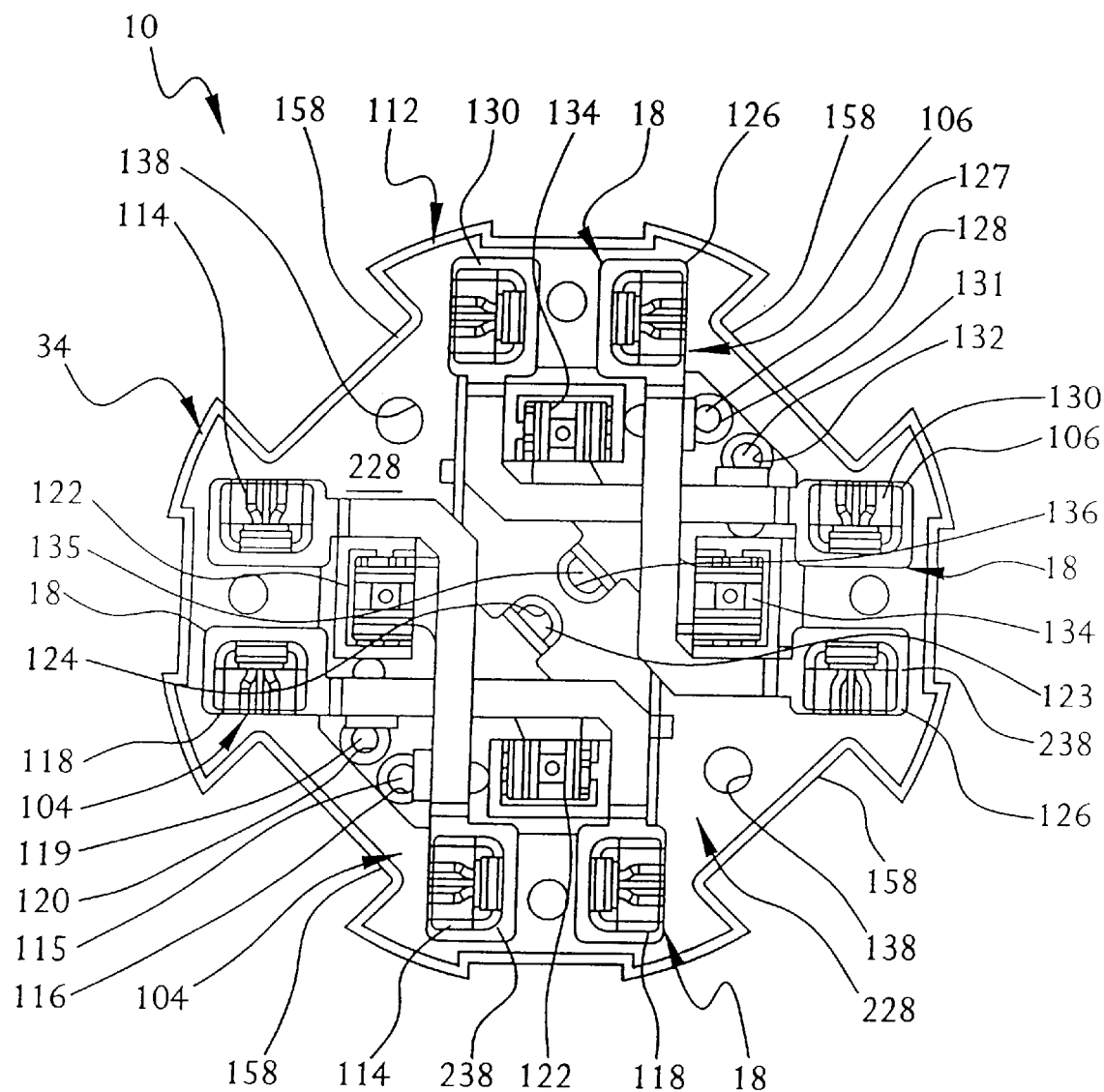
FIG. 7 is a top view of the base of the receptacle in accordance with the present invention, with bus bars and terminals exposed and positioned within the base.
Figure 8:
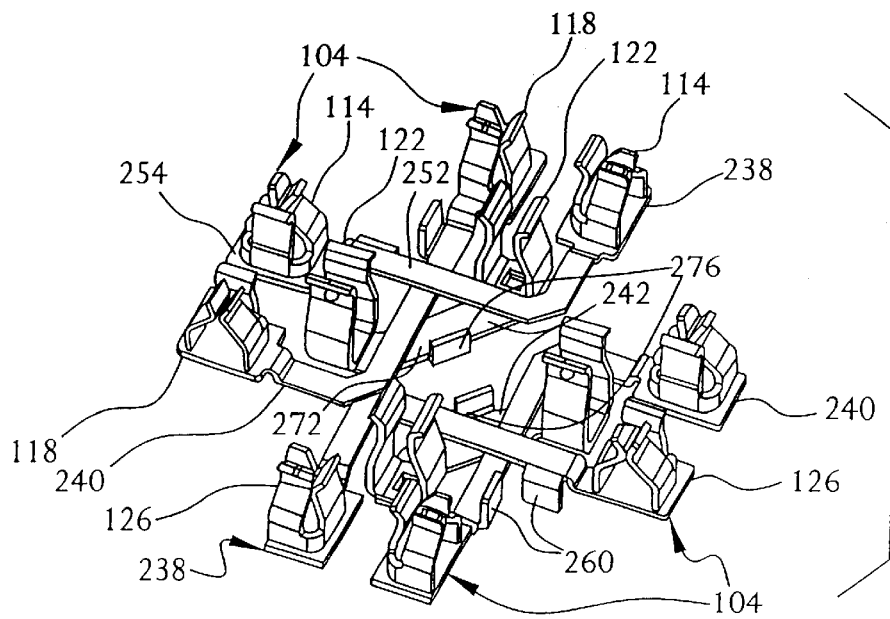
FIG. 8 is a top, front, side perspective view of the bus bars and terminals in accordance with the invention removed from the base but arranged as positioned with the base.
Figure 9:
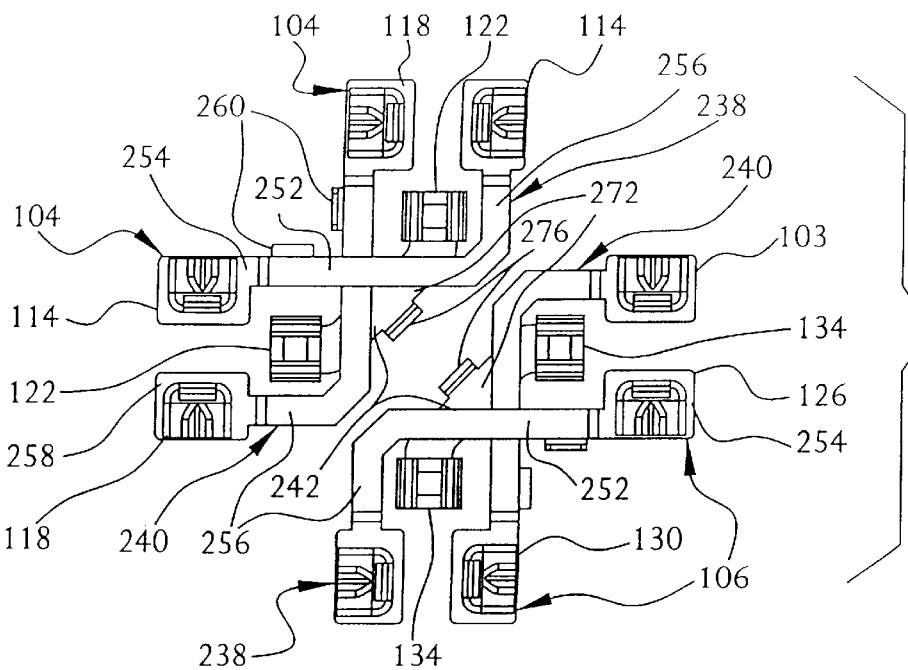
FIG. 9 is a top view of the bus bars and terminals in accordance with the invention removed from the base but arranged as positioned with the base.
Figure 10:
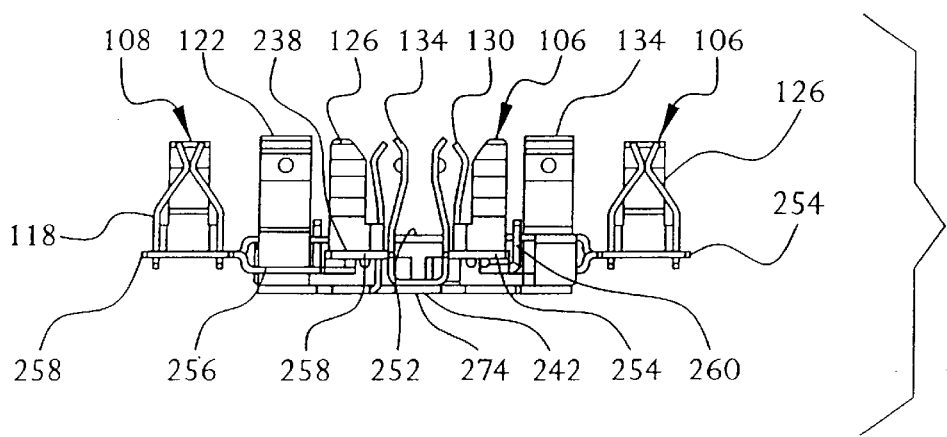
FIG. 10 is side view of the bus bars and terminals in accordance with the invention removed from the base but arranged as positioned with the base.
Figure 11:
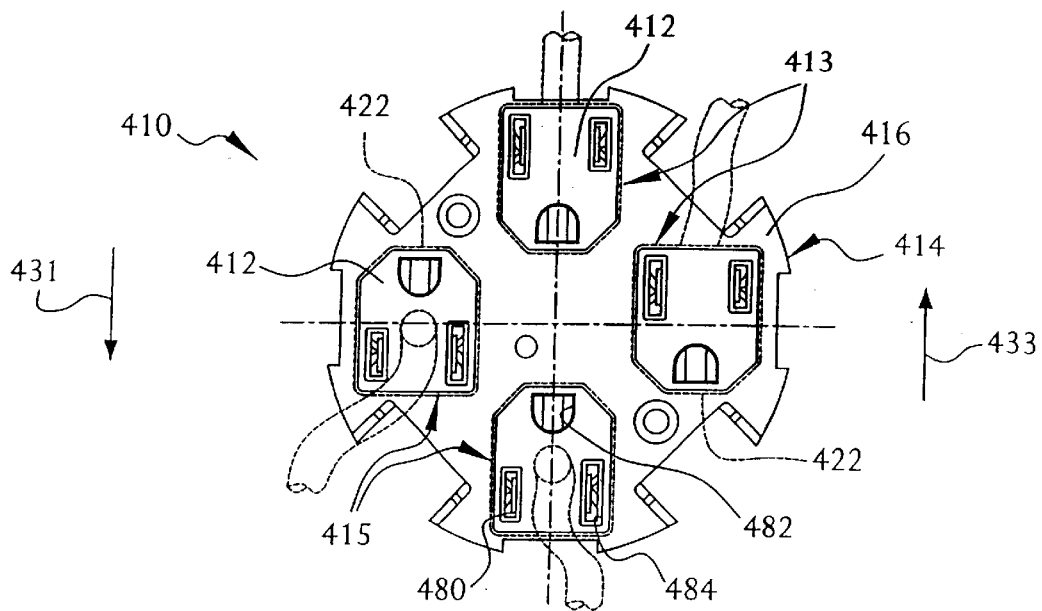
FIG. 11 is a top view of a fitting in accordance with a third embodiment of the present invention with the cover and flange removed.
Figure 12:
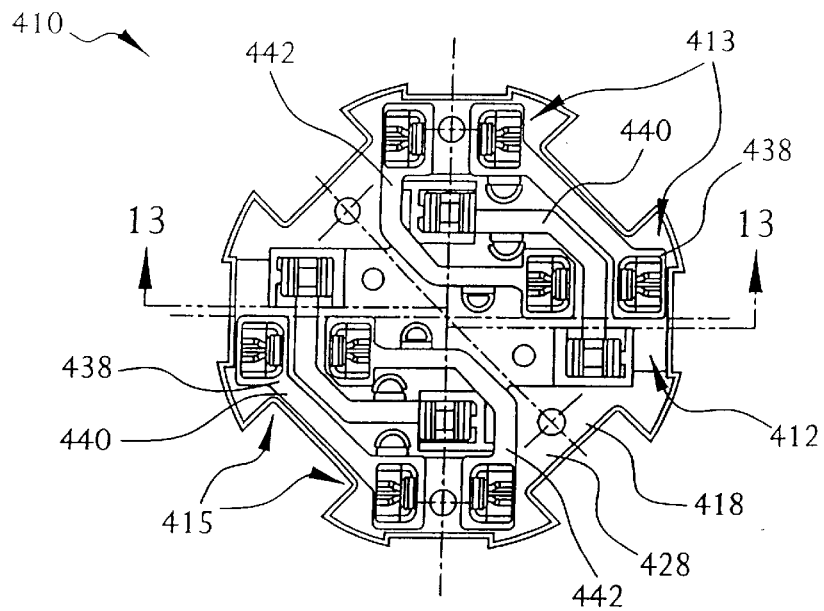
FIG. 12 is a top view of the fitting in accordance with the third embodiment of the present invention with the top of the receptacle removed and the bus bars shown.
Figure 13:
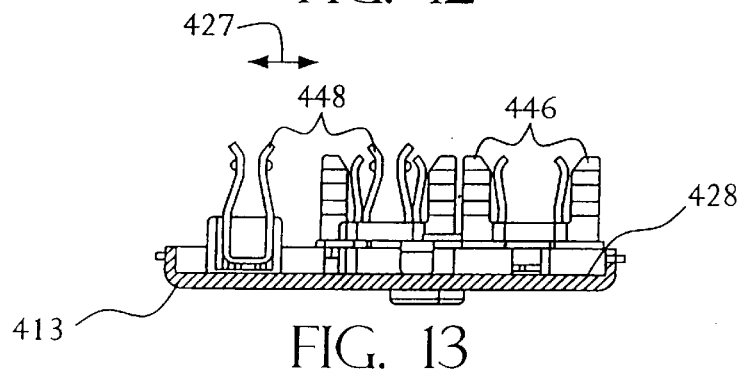
FIG. 13 is a cross-sectional view of the fitting illustrated in FIG. 12, taken along line 13—13 in FIG. 12.
Figure 14:
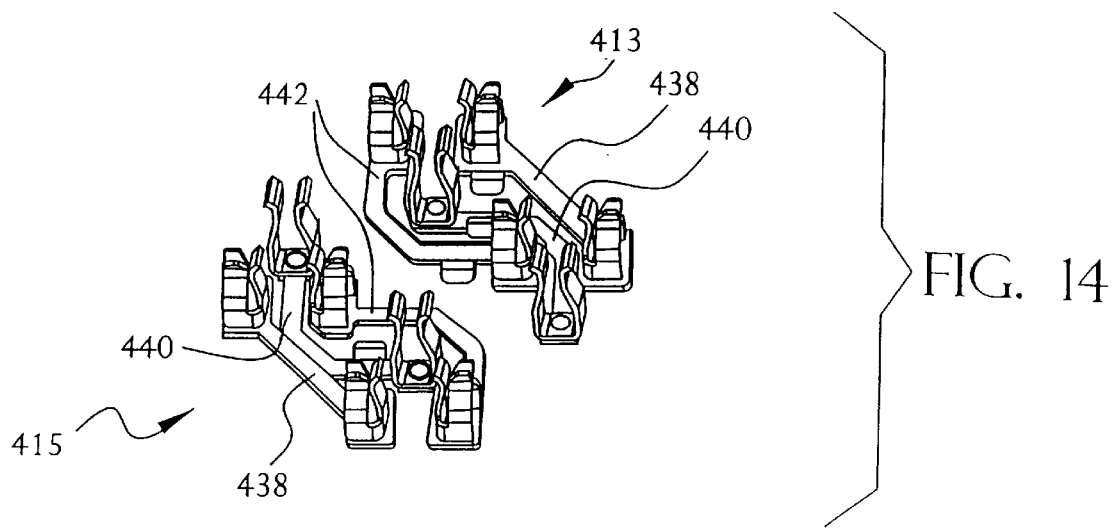
FIG. 14 is a top, side perspective view of the bus bars in accordance with the third embodiment of the present invention.
Figure 15:
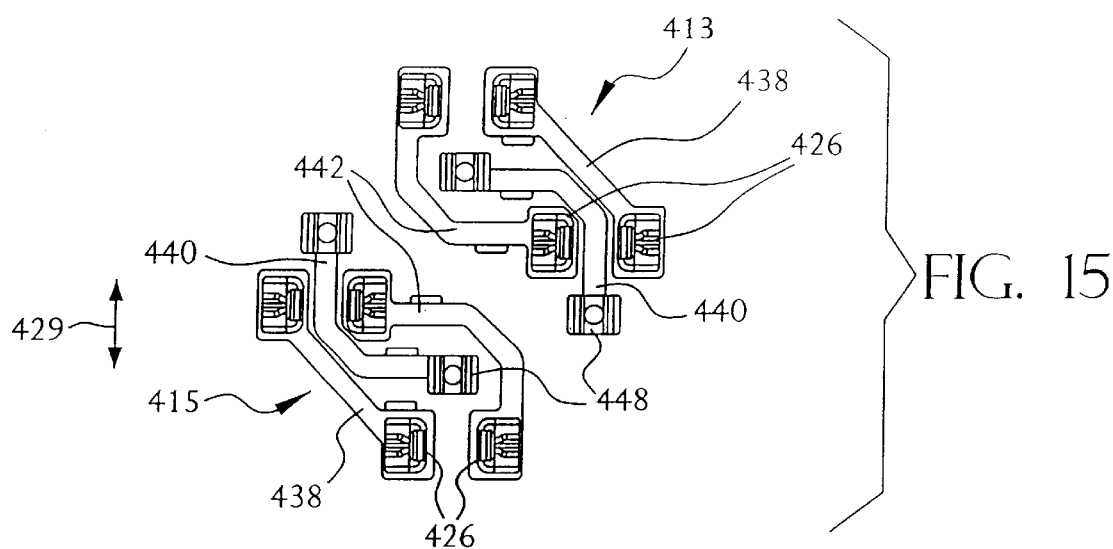
FIG. 15 is a top view of the bus bars illustrated in FIG. 14.
Figure 16:
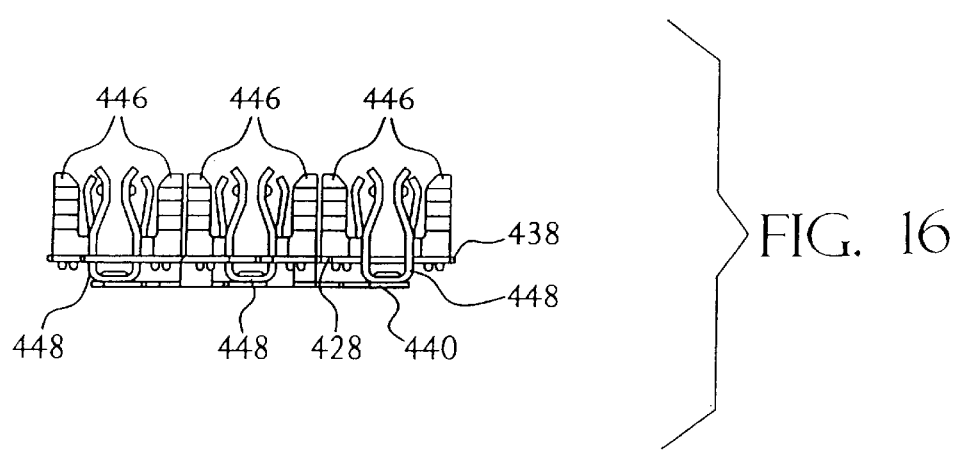
FIG. 16 is a side view of the bus bars illustrated in FIG. 14.
Figure 17:
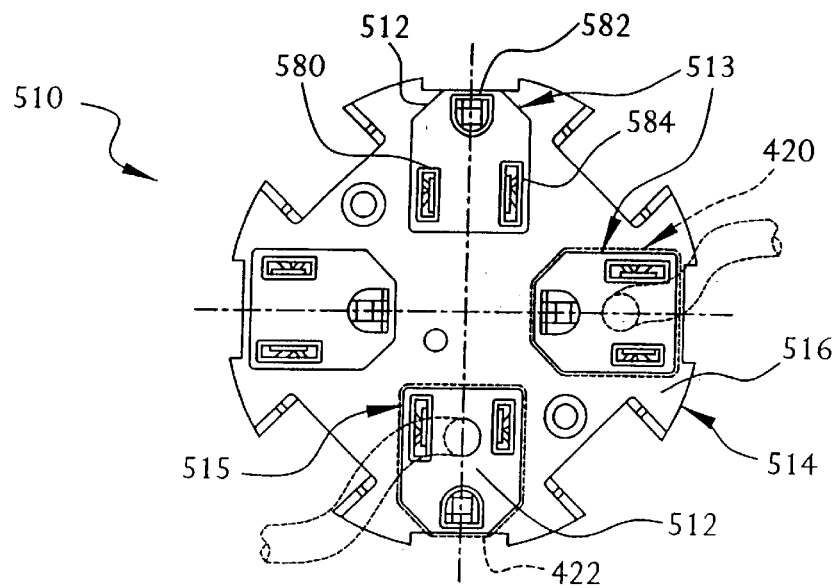
FIG. 17 is a top view of a fitting in accordance with a fourth embodiment of the present invention with the cover and flange removed.

FIG. 6 illustrates a fitting 310 in accordance with a second embodiment of the present invention. Fitting 310 is substantially identical in all respects to fitting 10 except for the manner in which the lead wires extend from their appropriate contact terminals and exit fitting 310. Specifically, fitting 310 includes a side "A" hot lead wire 315, a side "A" neutral lead wire 319, and side "A" ground lead wire 323, a side "B" hot lead wire 327, a side "B" neutral lead wire 331, and a side "B" ground lead wire 335 that all extend through their respective holes in base 112 as discussed above with respect to fitting 10 and their corresponding lead wires.

However, once the lead wires exit base 112 they are joined in fitting 310 in a manner different than in fitting 10. That is, the side "A" and side "B" hot lead wires 315 and 327 are connected below base 112 with a combined hot lead wire 350. Likewise, neutral lead wires 319 and 331 of sides "A" and "B" are connected below base 112 to the combined neutral lead wire 352 and ground lead wires 323 and 335 from sides "A" and "B" are connected below base 112 and combined with ground lead 354.

The connections between the "A" and "B" lead wires 315, 327, 319, 331, 323 and 335 and their respective combined lead wires 350, 352 and 354 are conventional connections, such as welding.

The connection of the hot lead wires 315, 327, and 350 is covered by a heat shrink tubing 340, as is generally known in the art. Likewise, the connection of the neutral lead wires 319, 331 and 352 is preferably covered by heat shrink tubing 342, and the connection of the ground lead wires 323, 335 and 354 is covered by heat shrink tubing 344.

Combined leads 350, 352 and 354 then proceed as known in the art to a single power source 142 with appropriate circuitry as known in the art. Thus, fitting 310 provides for both pairs of electrical outlets 104 and 106 being electrically connected to a single power source to simplify the circuitry.

Also, it should be understood that various combinations of lead connections can occur to further provide versatility in the manner in which electrical outlets are electrically wired. For example, only the ground lead wires 323 and 335 can be connected to a combined lead wire 354, while the hot and neutral lead wires remain substantially identical to those of fitting 10. Thus, five lead wires would then exit fitting 310. Another example would be to connect ground lead wires 323 and 335 to combined ground lead wire 354 and to connect neutral lead wires 319 and 331 to combined neutral lead wire 352. This would result in four lead wires exiting fitting 310.

Therefore, between fitting 10 and the various embodiments of fitting 310, three, four, five, or six wires can exit a fitting in accordance with the present invention.

Thus, fittings 10 and 310 provide fittings that can be used in a three inch bore and that optimize the arrangement of elements to produce a compact fitting with a relatively high number of electrical and voice/data connections while maintaining a low profile, which is generally flat and close to the floor. Additionally, although four electrical outlets 18 and four voice data jacks 20 are illustrated, fittings 10 and 310 can be adapted to contain any number of outlets 18 or jacks 20 desired.

FIGS. 7–10 illustrate the structure of outlets 104 and 106 more clearly. Each pair of outlets 104 and 106 is substantially identical so only outlet pair 104 will be discussed in detail. The pair of outlets 104 includes two L-shaped bus bars 238 and 240 and one U-shaped bus bar 242. Bus bar 238 is the hot bus bar and bus bar 240 is the neutral bus bar. L-shaped bus bars 238 and 240 are substantially identical except that bus bar 240 is positioned upside-down relative to bus bar 238. Of course, this saves in manufacturing costs since only two types of bus bars need be manufactured for the three bus bars required for a full assembly of a pair of outlets 104.

Each of bus bars 238 and 240 have a long section 252 with an end plate 254 attached thereto, a short section 256 an end plate 258 attached thereto, and a lead attaching member 260 extending from the long section 252. The member 260 permits attaching to one of lead 115 or 119. The terminals 114 and 118 are coupled to the end plates 254 and 258. With bus bar 238 the terminals 114 will be coupled to the top side of the plates 254 while with bus bar 240, the terminals 118 will be coupled to the bottom side of the plates 258. This use of both sides of plates 254 and 258 permits the bus bar to be used as bus bar 238 or bus bar 240. Additionally, the long and short sections 252 and 256 are bent in the same direction at the junction with plates 254 and 258 so that the plates 254 and 258 lie in a different plane than the long and short sections 252. This bending of the bus bars 238 and 240 enables the bus bars to be positioned in different planes when fully assembled, thus permitting the overlapping configuration. In other words, the bent bus bars 238 and 240 permit the bus bars to be overlapped while not touching.

U-shaped bus bar or ground bus bar 242 has a mid section 272, end portions 274, and a lead attaching member coupled to the mid section 272 for receiving lead wire 123. End portions 274 receive ground terminals 122. Mid section 272 and end portions 274 can be in one plane since the bending of the bus bars 238 and 240 permits no contact between any of the three bus bars 238, 240, and 242.

All bus bars 238, 240 and 242 are positioned on the top surface of base 112 with only the lead wires 115, 119, and 123 extending through the base 112. As set forth above, the lead wires 115, 119, and 123 can be spliced with other lead wired from the other pair of outlets 106 below the base.

FIGS. 11–16 illustrate a third embodiment in accordance with the present invention. Specifically, the third embodiment includes a fitting 410 having electrical outlets 412 having two sets of three bus bars 438, 440 and 442 received within receptacle 414. Receptacle 414 has a top 416 and a base 418. Fitting 410 is substantially identical to fitting 10 as described above except for the specific shape and orientation of bus bars 438, 440 and 442 and the necessary changes to outlets 412 and receptacle 414 to accommodate bus bars 438, 440 and 442 in the same manner in which outlets 18 and receptacle 34 are accommodated to receive bus bars 238, 240 and 242 in fitting 10.

Fitting 410 differs from fitting 10 in that fitting 410 employs non-overlapping bus bars 438, 440 and 442. That is, each bus bar 438, 440 and 442 is spaced from each other bus bar 438, 440 and 442 in a second direction 427 (FIG. 13) or a third direction 429 (FIG. 15), as viewed when looking down onto receptacle 414 in the direction 425 (FIG. 5) of insertion of the plugs 420 or when viewing FIG. 12 or 15. Therefore, during assembly the bus bars 438, 440 and 442 can be inserted into receptacle 414 in any order, thus, facilitating assembly of the fitting 410.

Each pair of outlets 413 and 415 is substantially identical so only outlet pair 413 will be discussed in detail. The pair of outlets 413 includes an outer, hot bus bar 438, a middle, ground bus bar 440, and an inner, neutral bus bar 442. In forming the second pair of outlets 415, bus bars 438, 440, and 442 are merely rotated 180degrees about the central axis of fitting 410 and used as bus bars in a substantially identical manner as with the pair of outlets 413. Of course, this saves in manufacturing costs since only three types of bus bars need be manufactured for the six bus bars required for a full assembly of two pairs of outlets 413 and 415.

Each of bus bars 438 and 442 function in a manner substantially identical to bus bars 238 and 242 but differ in shape and in that they lie in a single plane substantially perpendicular to the axis of fitting 410 and its respective circular opening. Bus bars 438 and 442 have terminals 446. Bus bar 440 functions in a manner substantially identical to bus bars 238, 240 and 242, but differs in shape, in that it lies in a single plane substantially perpendicular to the axis of fitting 410 and its respective circular opening, and in the absence of end plates. Bus bar 440 conserves space and requires a rivet to directly attach a terminal 448 for receiving a plug 420.

Although bus bars 438, 440 and 442 are generally planar, receptacle 414 is constructed to permit bus bars 438 and 442 to occupy one plane, which is substantially perpendicular to the axis of fitting 410, while bus bar 440 occupies a second plane, which is parallel to but spaced from the plane of bus bars 438 and 442. This permit additional spacing of bus bar 440 from bus bars 438 and 442.

All bus bars 438, 440 and 442 are positioned on the top surface of base 428 with only the lead wires 115, 119, and 123 extending through the base 418. As set forth above, the lead wires 115, 119, and 123 can be spliced with other lead wires from the other pair of outlets 415 below the base.

Receptacle top 416 is positioned over both sets of bus bars 438, 440 and 442 and has a set of three passageways 480, 482 and 484 positioned over the terminals of each outlet 412 to provide insulation from the bus bars while permitting the passage of prongs 423 through top 416 in order to contact the terminals 446 and 448 in a first direction 425. Passageways 480 and 484 are aligned with the hot and neutral terminals, respectively, and passageway 482 aligned with the ground terminal. Thus, each of the first and second pairs of outlets 413 and 415 are oriented parallel to each other, with two of the outlets 412 radially aligned with fitting 410 and with two outlets 412 aligned tangentially and non-radially with respect to the center of fitting 410. At least two of the electrical plugs are substantially parallel to each other with the front surfaces 422 of each plug facing in substantially the same or a first direction 431 (FIG. 11) and at least two electrical plugs are substantially parallel to each other with the front surfaces 422 of each plug facing in a second direction 433, which is opposite the first direction 431.

FIGS. 17–22 illustrate a fourth embodiment in accordance with the present invention. Specifically, the fourth embodiment includes a fitting 510 having electrical outlets 512 having two sets of three bus bars 538, 540 and 542 received within receptacle 514. Receptacle 514 has a top 516 and a base 518. Fitting 510 is substantially identical to fitting 10 as described above except for the specific shape and orientation of bus bars 538, 540 and 542 and the necessary changes to outlets 512 and receptacle 514 to accommodate bus bars 538, 540 and 542 in the same manner in which outlets 18 and receptacle 34 are accommodated to receive bus bars 238, 240 and 242 in fitting 10.

Figure 18:
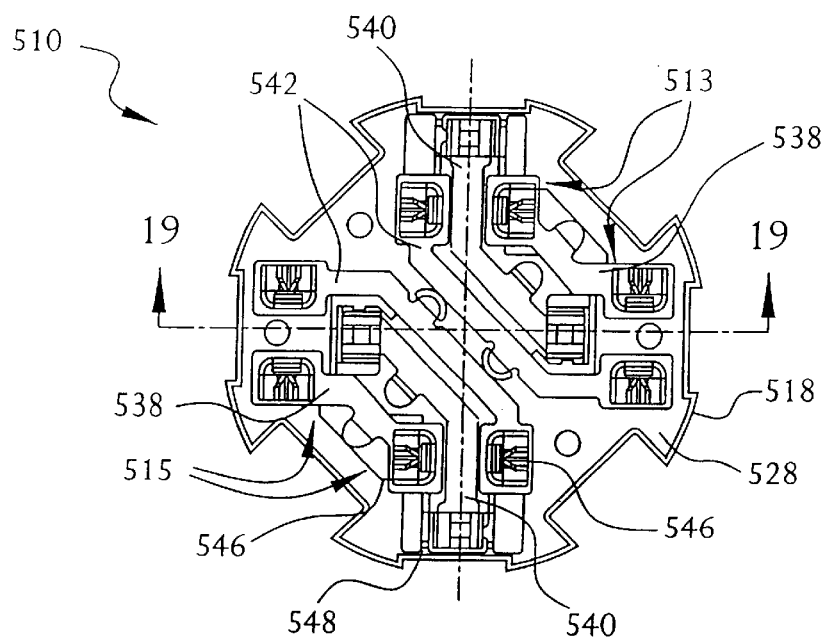
FIG. 18 is a top view of the fitting in accordance with the fourth embodiment of the present invention with the top of the receptacle removed and the bus bars shown.
Figure 19:
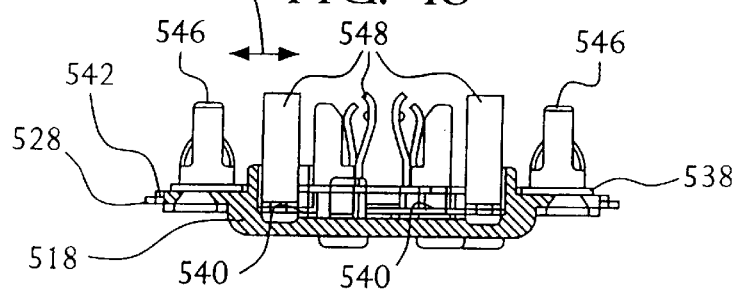
FIG. 19 is a cross-sectional view of the fitting illustrated in FIG. 18, taken along line 19—19 in FIG. 18.
Figure 20:
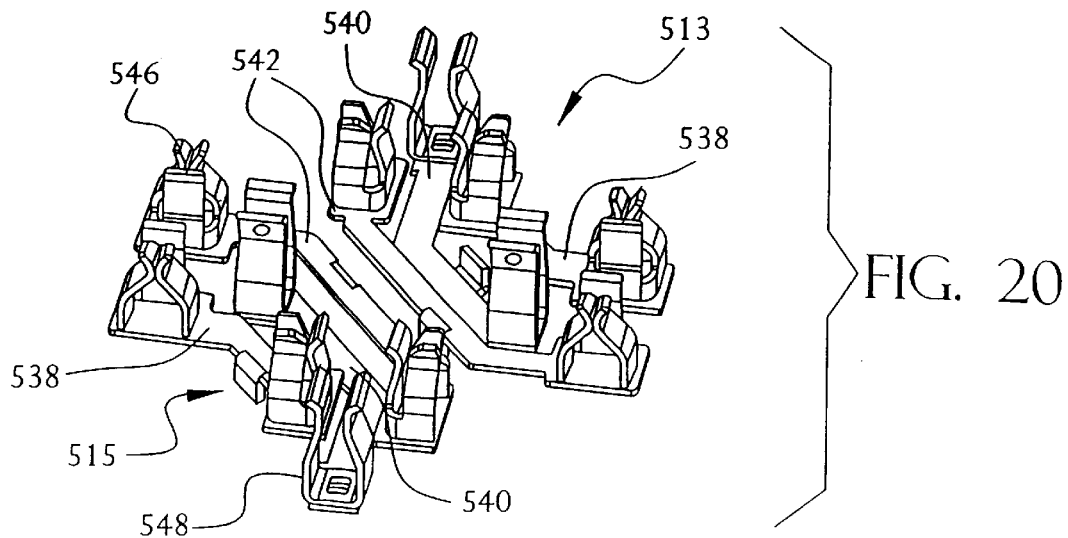
FIG. 20 is a top, side perspective view of the bus bars in accordance with the fourth embodiment of the present invention.
Figure 21:
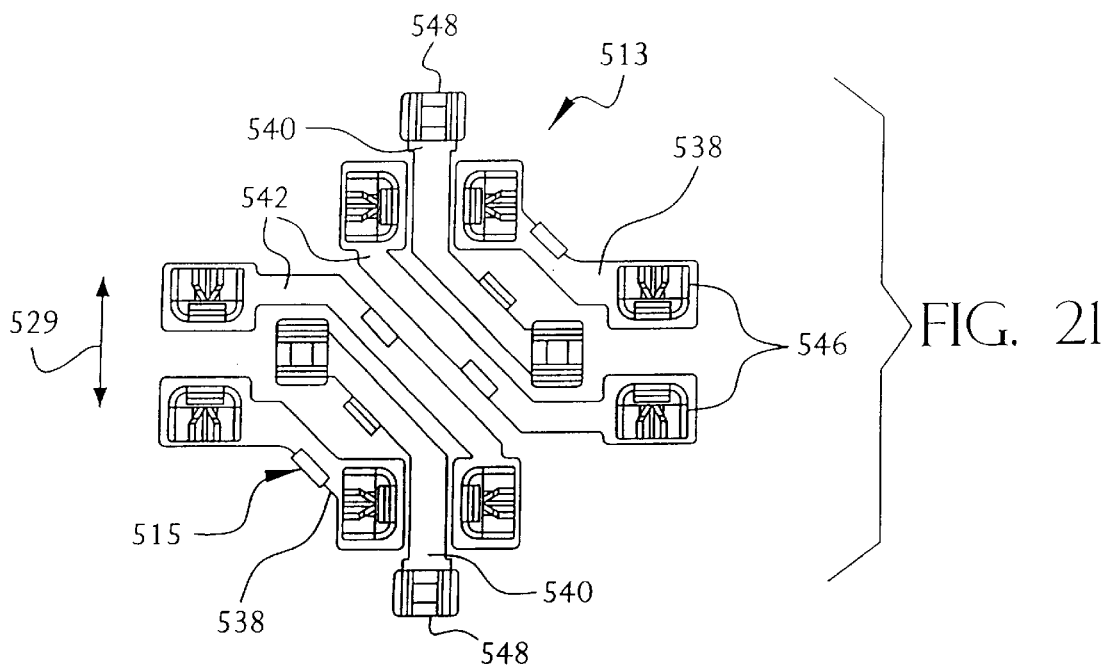
FIG. 21 is a top view of the bus bars illustrated in FIG. 20.
Figure 22:
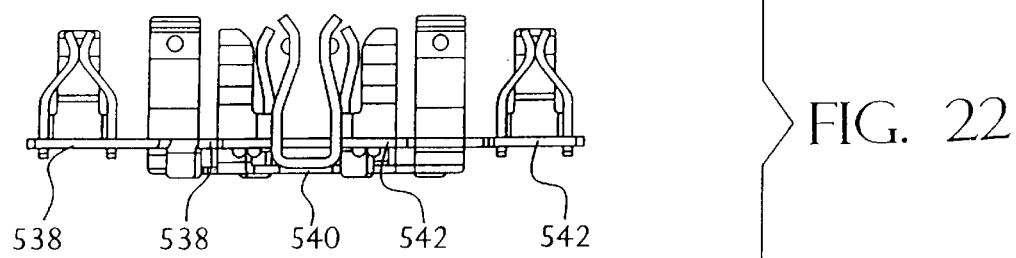
FIG. 22 is a side view of the bus bars illustrated in FIG. 20.
Figure 23:
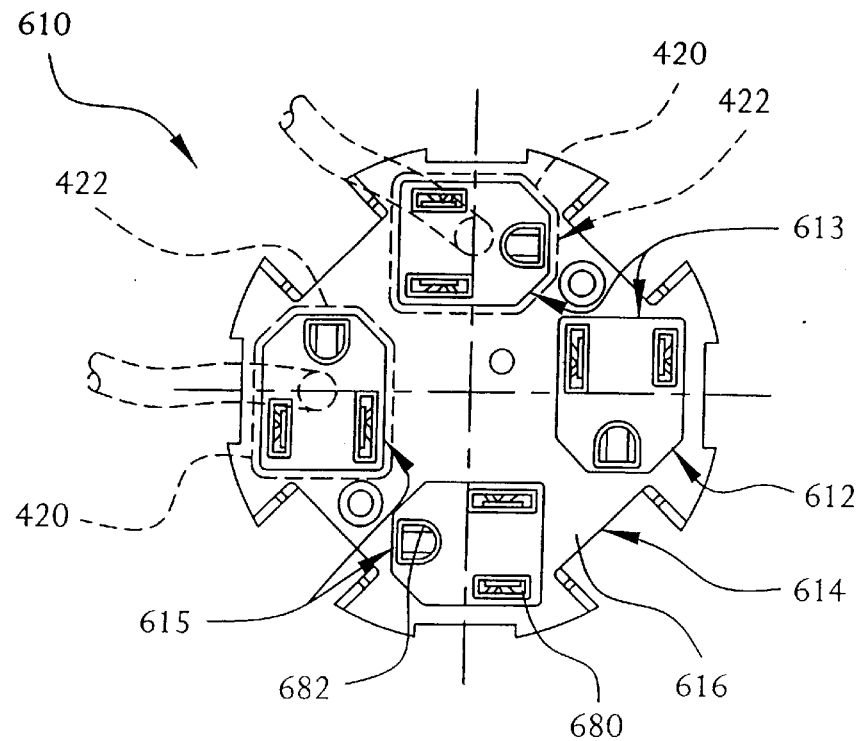
FIG. 23 is a top view of a fitting in accordance with a fifth embodiment of the present invention with the cover and flange removed.
Figure 24:
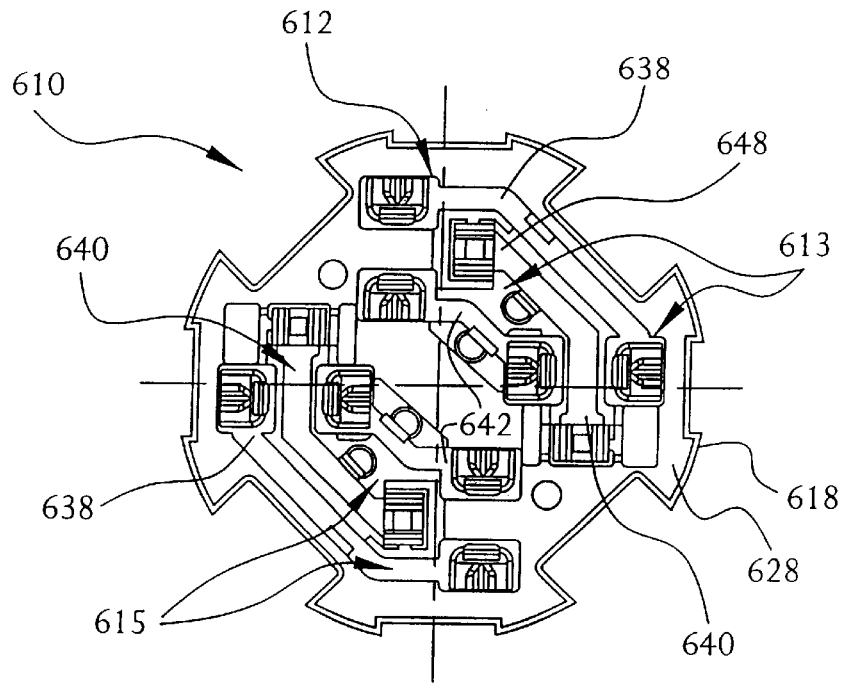
FIG. 24 is a top view of the fitting in accordance with the fifth embodiment of the present invention with the top of the receptacle removed and the bus bars shown.
Figure 25:
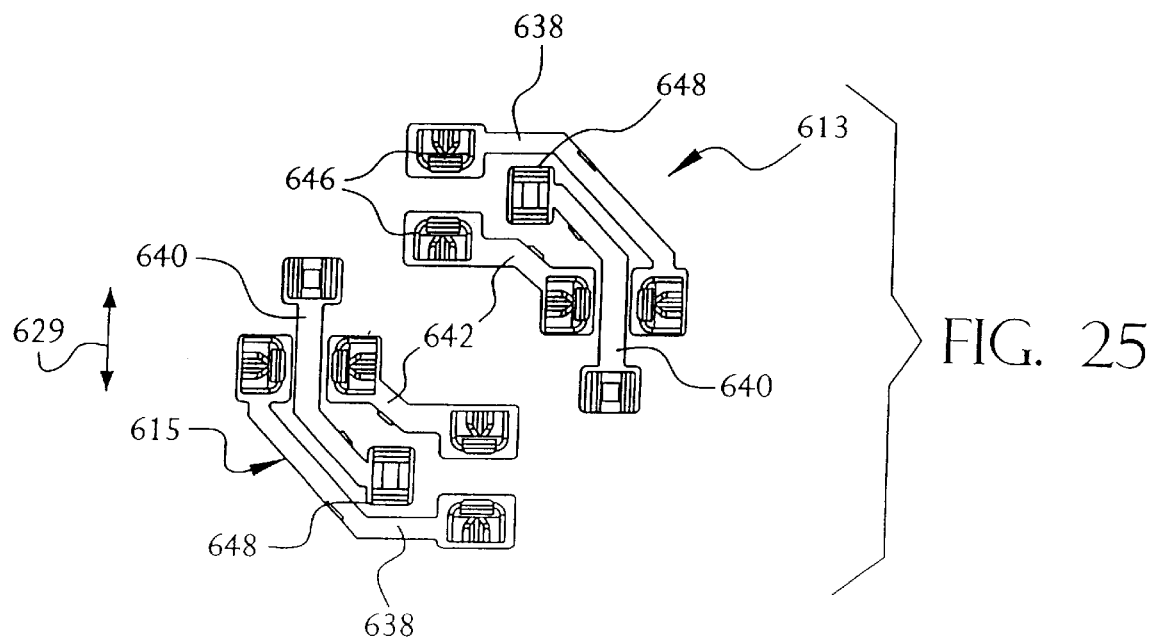
FIG. 25 is a top view of the bus bars illustrated in FIG. 24.
Figure 26:
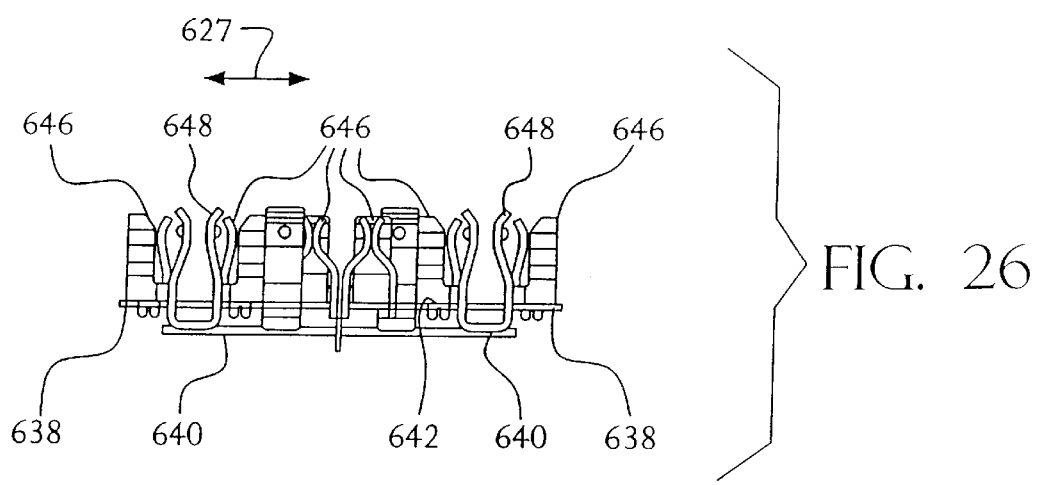
FIG. 26 is a side view of the bus bars illustrated in FIG. 25.

Fitting 510 differs from fitting 10 in that fitting 510 employs non-overlapping bus bars 538, 540 and 542. That is, each bus bar 538, 540 and 542 is spaced from each other bus bar 538, 540 and 542 in a second direction 527 (FIG. 19)

or a third direction 529 (FIG. 21), as viewed when looking down onto receptacle 514 in the direction 425 of insertion of the plugs 420 or when viewing FIG. 18 or 21. Therefore, during assembly the bus bars 538, 540 and 542 can be inserted into receptacle 514 in any order, thus, facilitating assembly of the fitting 510.

Each pair of outlets 513 and 515 is substantially identical so only outlet pair 513 will be discussed in detail. The pair of outlets 513 includes an outer, hot bus bar 538, a middle, ground bus bar 540, and an inner, neutral bus bar 542. In forming the second pair of outlets 515, bus bars 538, 540, and 542 are merely rotated 180degrees about the central axis of fitting 510 and used as bus bars in a substantially identical manner as with the pair of outlets 513. Of course, this saves in manufacturing costs since only three types of bus bars need be manufactured for the six bus bars required for a full assembly of two pairs of outlets 513 and 515.

Each of bus bars 538 and 542 function in a manner substantially identical to bus bars 238 and 242 but differ in shape and in that they lie in a single plane substantially perpendicular to the axis of fitting 510 and its respective circular opening. Bus bars 538 and 542 have terminals 546. Bus bar 540 functions in a manner substantially identical to bus bar 240 but differs in shape, in that it lies in a single plane substantially perpendicular to the axis of fitting 510 and its respective circular opening, and in the absence of end plates. Bus bar 540 conserves space and requires a rivet to directly attach a terminal 548 for receiving a plug 420.

Although bus bars 538, 540 and 542 are generally planar, receptacle 514 is constructed to permit bus bars 538 and 542 to occupy one plane, which is substantially perpendicular to the axis of fitting 510, while bus bar 540 occupies a second plane, which is parallel to but spaced from the plane of bus bars 538 and 542. This permit additional spacing of bus bar 540 from bus bars 538 and 542.

All bus bars 538, 540 and 542 are positioned on the top surface of base 528 with only the lead wires 115, 119, and 123 extending through the base 518. As set forth above, the lead wires 115, 119, and 123 can be spliced with other lead wires from the other pair of outlets 515 below the base.

Receptacle top 516 is positioned over both sets of bus bars 538, 540 and 542 and has a set of three passageways 580, 582 and 584 positioned over the terminals of each outlet 512 to provide insulation from the bus bars while permitting the passage of prongs 523 through top 516 in order to contact the terminals 546 and 548. Passageways 580 and 584 are aligned with the hot and neutral terminals, respectively, and passageway 582 aligned with the ground terminal. Each of the outlets 512 are radially aligned with fitting 510 and with two outlets 512 aligned facing towards the center and two outlets aligned facing away from the center.

FIGS. 23–26 illustrate a fifth embodiment in accordance with the present invention. Specifically, the fifth embodiment includes a fitting 610 having electrical outlets 612 having two sets of three bus bars 638, 640 and 642 received within receptacle 614. Receptacle 614 has a top 616 and a base 618. Fitting 610 is substantially identical to fitting 10 as described above except for the specific shape and orientation of bus bars 638, 640 and 642 and the necessary changes to outlets 612 and receptacle 614 to accommodate bus bars 638, 640 and 642 in the same manner in which outlets 18 and receptacle 34 are accommodated to receive bus bars 238, 240 and 242 in fitting 10.

Fitting 610 differs from fitting 10 in that fitting 610 employs non-overlapping bus bars 638, 640 and 642. That is, each bus bar 638, 640 and 642 is spaced from each other bus bar 638, 640 and 642 in a second direction 627 (FIG. 26) or a third direction 629 (FIG. 25), as viewed when looking down onto receptacle 614 in the direction 425 of insertion of the plugs 420 or when viewing FIG. 24 or 25. Therefore, during assembly the bus bars 638, 640 and 642 can be inserted into receptacle 614 in any order, thus, facilitating assembly of the fitting 610.

Each pair of outlets 613 and 615 is substantially identical so only outlet pair 613 will be discussed in detail. The pair of outlets 613 includes an outer, hot bus bar 638, a middle, ground bus bar 640, and an inner, neutral bus bar 642. In forming the second pair of outlets 615, bus bars 638, 640, and 642 are merely rotated 180degrees about the central axis of fitting 610 and used as bus bars in a substantially identical manner as with the pair of outlets 613. Of course, this saves in manufacturing costs since only three types of bus bars need be manufactured for the six bus bars required for a full assembly of two pairs of outlets 613 and 615.

Each of bus bars 638 and 642 function in a manner substantially identical to bus bars 238 and 242 but differ in shape and in that they lie in a single plane substantially perpendicular to the axis of fitting 610 and its respective circular opening. Bus bars 638 and 642 have terminals 646. Bus bar 640 functions in a manner substantially identical to bus bars 238, 240 and 242, but differs in shape, that it lies in a single plane substantially perpendicular to the axis of fitting 610 and its respective circular opening, and in the absence of end plates. Bus bar 640 conserves space and requires a rivet to directly attach a terminal 648 for receiving a plug 420.

Although bus bars 638, 640 and 642 are generally planar, receptacle 614 is constructed to permit bus bars 638 and 642 to occupy one plane, which is substantially perpendicular to the axis of fitting 610, while bus bar 640 occupies a second plane, which is parallel to but spaced from the plane of bus bars 638 and 642. This permit additional spacing of bus bar 640 from bus bars 638 and 642.

All bus bars 638, 640 and 642 are positioned on the top surface of base 628 with only the lead wires 115, 119, and 123 extending through the base 618. As set forth above, the lead wires 115, 119, and 123 can be spliced with other lead wires from the other pair of outlets 615 below the base.

Receptacle top 616 is positioned over both sets of bus bars 638, 640 and 642 and has a set of three passageways 680, 682 and 684 positioned over the terminals of each outlet 612 to provide insulation from the bus bars while permitting the passage of prongs 623 through top 616 in order to contact the terminals 646 and 648. Passageways 680 and 684 are aligned with the hot and neutral terminals, respectively, and passageway 682 aligned with the ground terminal. The outlets 612 are all aligned tangentially and non-radially with respect to the center of fitting 610.

The arrangement of the bus bars, terminals and receptacles discussed herein, for simplicity, have been illustrated in order to receive common, three prong electrical plugs having a round, ground prong and parallel, hot and neutral prongs, which are generally rectangular in cross-section. It should be understood that the receptacle and bus bar assemblies of the various embodiments of the subject invention could be modified and reconfigured to receive any type of electrical plug.

While particular embodiments have been chosen to illustrate the invention, it will be understood by those skilled in the art that various changes and modifications can be made therein without departing from the scope of the invention as defined in the appended claims.

What is claimed is:

1. A fitting assembly comprising:
   a first pair of electrical plugs, each of said plugs having a base (a) a hot prong and a neutral prong extending from said base, and (b) a front surface of said plug oriented transversely to said base and extending in a direction opposite said hot and neutral prongs;
   a surface having a substantially circular opening;
   an electrical receptacle positioned within said opening;
   a first pair of electrical outlets coupled to said electrical receptacle with said first pair of electrical plugs being positioned within said first pair of electrical outlets, and each electrical outlet in said first pair of electrical outlets being substantially parallel to each other and each of said front surfaces of each of said electrical plugs in said first pair of electrical plugs facing in a first direction.

2. A fitting assembly according to claim 1, further comprising:
   a second pair of electrical plugs, each of said plugs having prongs extending from a base and a front surface extending transversely to said base;
   a second pair of electrical outlets coupled to said electrical receptacle with said second pair of electrical plugs being positioned within said second pair of electrical outlets and each electrical outlet in said second pair of electrical outlets being substantially parallel to each other with said front surface of each of said plug in said second pair of electrical plugs facing in a second direction, which is opposite to said first direction.

3. A fitting assembly according to claim 1, wherein said opening has an approximately three-inch diameter.

4. A poke through fitting extending through an aperture in a floor, comprising:
   a generally circular housing having a center, a periphery and a top a surface, a portion of said housing received within the aperture in the floor; and
   first, second, third and fourth electrical outlets positioned within said housing, each of said outlets having first and second apertures extending therethrough, said apertures adapted to receive the prongs of an electrical plug;
   wherein said first apertures for said first and second electrical outlets are positioned closer to said center of said housing than said second apertures for said first and second electrical outlets and said second apertures for said first and second electrical outlets are positioned between said first aperture and said periphery of said housing and said first and second apertures for said third and fourth electrical outlets are positioned substantially equidistant from said center of said housing.

5. A poke through fitting according to claim 4, wherein said first and second electrical outlets are positioned adjacent each other.

6. A poke through fitting according to claim 4, wherein said third and fourth electrical outlets are positioned adjacent each other.

7. A poke through fitting according to claim 4, wherein each of said outlets is positioned about the same distance from said center as each other outlet and each outlet is positioned substantially equidistant from each adjacent outlet.

8. A poke through fitting according to claim 4, wherein each of said outlets has a ground aperture, and said first and second apertures in each of said outlets are substantially rectangular and extend generally in the direction of said ground aperture.

9. A poke through fitting according to claim 8, wherein said ground apertures for said third and fourth electrical outlets are positioned closer to the center of the housing than said first and second apertures for each respective outlet.

10. A poke through fitting extending through an aperture in a floor, comprising:
    a housing having a generally circular circumference, a center and a top surface, a portion of said housing received within the aperture in the floor; and
    first and second pairs of electrical outlets positioned within said housing, each of said outlets having first and second apertures extending therethrough, said apertures adapted to receive the prongs of an electrical plug, and each of said first apertures in a respective outlet extending substantially parallel to said second aperture of said respective outlet;
    wherein said first and second apertures in said first pair of electrical outlets extend substantially parallel to a tangent extending from said generally circular circumference proximal to each respective outlet in said first pair of electrical outlets and said first and second apertures in said second pair of electrical outlets extend substantially parallel to a radius extending from said center to said generally circular circumference proximal to each respective outlet in said second pair of electrical outlets.

11. A poke through fitting according to claim 10, wherein each outlet in said first pair of electrical outlets is positioned adjacent the other respective outlet in said first pair.

12. A poke through fitting according to claim 10, wherein each outlet in said second pair of electrical outlets is positioned adjacent the other respective outlet in said second pair.

13. A poke through fitting according to claim 10, wherein each pair of outlets is positioned about the same distance from said center as each other pair of outlets and each outlet is positioned equidistant from each adjacent outlet.

14. A poke through fitting according to claim 10, wherein each outlet has a ground aperture and said first and second apertures extend generally in the direction of said ground aperture.

15. A poke through fitting according to claim 14, wherein each of said ground apertures in each of said outlets in said second pair of electrical outlets is positioned closer to the center of the housing than said first and second apertures for each respective outlet.

16. A poke through fitting extending through an aperture in a floor, comprising:
    a housing having a generally circular circumference, a center and a top surface, a portion of said housing received within the aperture in the floor; and
    first, second, third and fourth electrical outlets positioned within said housing, each of said outlets having a first aperture, a second aperture, and a ground aperture extending therethrough, said apertures adapted to receive the prongs of an electrical plug, each of said first apertures in a respective outlet extending substantially parallel to said second aperture of said respective outlet and in a direction generally toward said ground aperture of said respective outlet;

wherein said a longitudinal axis of each of first and second apertures in each of said electrical outlets extends substantially parallel to a tangent extending from said generally circular circumference proximal to each respective outlet.

17. A poke through fitting according to claim 16, wherein each outlet is positioned proximal to the generally circular circumference of said housing.

18. A poke through fitting according to claim 16, wherein each outlet is positioned about the same distance from said center as each other outlet and each outlet is positioned substantially equidistant from each adjacent outlet.

19. A poke through fitting according to claim 16, wherein said ground apertures for each of said outlets are positioned closer to the center of the housing than at least one of said first and second apertures for each respective outlet.

20. A poke through fitting according to claim 19, wherein said ground apertures for each of said outlets are positioned farther from the center of the housing than at least one of said first and second apertures for each respective outlet.

* * * * *